United States Patent [19]

McHenry et al.

[11] Patent Number: 4,526,821

[45] Date of Patent: Jul. 2, 1985

[54] MULTI-LAYER CONTAINER AND METHOD OF MAKING SAME

[75] Inventors: Robert J. McHenry, St. Charles; Robert Seebohm, Barrington, both of Ill.

[73] Assignee: American Can Company, Greenwich, Conn.

[21] Appl. No.: 59,374

[22] Filed: Jul. 20, 1979

[51] Int. Cl.³ ............... B29C 17/07; B29D 9/04; B29F 1/06; B32B 1/02

[52] U.S. Cl. .................... 428/35; 206/524.6; 264/328.8; 264/513; 426/113; 426/114; 426/127; 428/516; 428/520

[58] Field of Search ............ 428/35, 516, 520; 264/513, 328.8; 526/113, 114, 127

[56] References Cited

U.S. PATENT DOCUMENTS

| | | | |
|---|---|---|---|
| 3,173,175 | 3/1965 | Lemelson | 55/235 |
| 3,616,495 | 11/1971 | Lemelson | 425/152 |
| 3,820,928 | 6/1974 | Hehl | 425/155 |
| 3,882,259 | 5/1975 | Nohara | 428/516 |
| 3,947,177 | 3/1976 | Eckhardt | 425/543 |
| 4,013,748 | 3/1977 | Valyi | 264/513 |
| 4,079,850 | 3/1978 | Suzuki et al. | 428/35 |
| 4,144,013 | 3/1979 | Simmons | 264/513 |
| 4,174,413 | 11/1979 | Yasuike et al. | 428/35 |
| 4,255,490 | 3/1981 | Katsura | 428/515 |

FOREIGN PATENT DOCUMENTS

| | | | |
|---|---|---|---|
| 2733913 | 2/1978 | Fed. Rep. of Germany. | |
| 39190 | 12/1970 | Japan | 264/513 |
| 2773 | 1/1976 | Japan | 264/513 |
| 1445907 | 8/1976 | United Kingdom. | |
| 1510115 | 5/1978 | United Kingdom. | |
| 1510116 | 5/1978 | United Kingdom. | |

*Primary Examiner*—James C. Cannon
*Attorney, Agent, or Firm*—Paul R. Audet

[57] ABSTRACT

A rigid container is made by injection molding a parison having plural layers of polymers. The parison is blow molded to the final shape of the container. Control during injection is exercised over each of the plural polymers so as to produce uninterrupted layers extending throughout the walls of the parison and to insure that the interior layers are completely encapsulated within the outer layers.

47 Claims, 21 Drawing Figures

MULTI-LAYER CONTAINER AND METHOD OF MAKING SAME

BACKGROUND OF THE INVENTION

Food product rigid containers generally must be impermeable to oxygen. Most common structural polymers for rigid food containers are permeable to oxygen which invades the food product causing degradation of spoilage. Those polymers which are sufficiently impermeable to oxygen generally are not suitable alone for rigid containers for foods because they do not possess adequate structural properties, are moisture sensitive, or are not approved for or are of questionable safety when used in contact with foods. Ethylene vinyl alcohol co-polymer (EVOH) is a transparent extrusible material possessing high impermeability to oxygen when dry, many times less permeable than acrylonitrile copolymers, but is very moisture sensitive. The oxygen barrier properties of EVOH are markedly diminished in the presence of significant quantities of water. To be useful for food packaging, particularly where extended shelf life is required, EVOH must be kept dry as by total encapsulation within polymers which have good moisture barrier properties.

Many foods are processed in the container in a pressure cooker or retort. Retort conditions commonly are 250° F. at 30 psia steam pressure. A rigid container must survive retort conditions. It must not permanently distort during cooking or during cooling, and must not suffer an alteration of the desirable properties of its components. Polyolefins, particularly blends or copolymers of polypropylene and polyethylene, are well suited to manufacture of rigid containers and have adequate physical properties to survive retorting. Polyolefins are relatively poor oxygen barriers, but are relatively good moisture barriers. The use of polyolefins with a central core of an oxygen barrier polymer is a desired goal of the food packaging industry.

Nohara et al. U.S. Pat. No. 3,882,259 discloses a three ply plastic bottle having a core of EVOH blended with Surlyn A brand ionomer resin and outer plies of polyethylene blended with Surlyn A. The Surlyn A ionomer is added to both the EVOH and the polyethylene resin materials to improve adhesion between layers. The bottle is to be made by extrusion blow molding thereby the three layers are simultaneously extruded to produce a three ply tube. While still hot from extrusion, the tube is pinched together at the bottom to form a seal and inflated in a blow mold having the shape of the desired bottle.

Extrusion blow molding has four serious drawbacks when used to form multi-layer containers having a core ply of a moisture sensitive barrier material such as EVOH.

First, the pinch seal at the bottom leaves the core ply of EVOH exposed on the bottle exterior. Since EVOH and certain other barrier materials are adversely affected by moisture, exposure of the core ply at the container bottom renders the container susceptible to loss of barrier quality by intrusion of moisture. The risk that the container exterior will encounter damp conditions in storage or transport is high and the resulting loss of barrier quality will degrade or spoil the food. First, retort conditions are such that moisture from the steam will intrude into the barrier layer through the exposed barrier at the bottom.

Second, extrusion blow molding necessarily produces scrap as a result of the pinch sealing procedure. Since the scrap contains materials from each of the three layers, re-extrusion of the scrap is difficult and expensive.

Third, the pinch seal produces a bottom of non-uniform thickness and strength. The sealing takes place along a line between the abutting faces of the inner layer material. The seal line is bordered by regions of relatively thick material. When stretched during blow molding, the bottom varies in thickness in the vicinity of the pinch seal. Because of the thickness variation due to the pinch seal, the stiffness of the bottom is not uniform along all diameters. Consequently, the bottom does not evenly respond to expansion and contraction as the product changes in temperature. This lack of even response causes unpredictable performance of the container when retorted.

Fourth, the pinch seal may create an interruption in the barrier layer. If the inside surface layer is interposed between the barrier layer at the seal, a line lacking barrier material will result. The area of the interruption may be great enough to allow sufficient oxygen to enter to be a problem.

Because of these disadvantages, extrusion blow molding cannot produce an entirely satisfactory three layer rigid container having a core barrier layer of a moisture sensitive polymer such as EVOH, particularly where the container is intended for retorting.

SUMMARY OF THE PRESENT INVENTION

The present invention is concerned with apparatus for making a plastic container by injection molding or by an injection blow molding technique which produces a container whose walls are multiple plies of different polymers. In particular, the container walls comprise inner and outer layers of structural polymers such as polyolefins or a blend of polyolefins on either side of a core layer of a polymer having oxygen barrier properties such as EVOH.

Injection blow molding is a process whereby a pre-form or parison is formed by injection molding in a cavity. The parison is transferred to a blow mold cavity and blown to the shape of the desired container. The parison can be retained on the core pin of the injection mold and transferred on the core pin to the blow molding cavity. The parison can be temperature conditioned before blow molding to achieve an optimum temperature or profile of temperatures. The core pin can be temperature controlled and the exterior of the parison can be temperature conditioned by contact with air or other fluid such that blow molding occurs at optimal conditions. Orientation can be achieved as the parison is stretched during blow molding. Injection blow molding produces no scrap and requires no pinch seal.

According to the present invention, polymer melts for the inside and outside surface layers and the core layer of the container walls are substantially simultaneously injected into a parison mold cavity through an injection nozzle having separate passages for each polymer melt arranged to lead to coaxial annular nozzle orifices surrounding the central orifice. Additional layers or layers interposed between the surface and core layers can also be injected simultaneously to produce a container wall having four or more layers.

The initiation, rate, and termination of flow for each layer are independently and continuously controlled to provide control over the thickness of each layer and to insure that the core layer or layers are totally encapsulated between the surface layers. The injection molded parison is transferred on the core pin to a blow mold cavity having the shape of the container and is then blow molded into the finished container. Temperature conditioning of the parison just prior to blowing can result in biaxial orientation of the various polymers to achieve desirable improvements in physical properties such as impermeability, clarity, tensile strength, impact strength, and resistance to creep. The resulting product has a barrier layer or layers which extend without interruption throughout the container, yet are completely encapsulated within the material of the inside and outside surface layers. Since the barrier layer is protected from moisture by the moisture barrier properties of the surface layers, the oxygen barrier quality is preserved.

DESCRIPTION OF A PREFERRED EMBODIMENT

The machine of the present invention injection molds a multi-layer parison from a plurality of polymers, each separately plasticated and fed to separate injection rams. The rams each force a shot of polymer to appropriate nozzle passages which lead to the entrance of the injection mold cavity. Conditions are controlled to advance the several polymer melts substantially simultaneously in the die cavity under non-turbulent flow conditions to preserve the polymers as discrete layers in the parison. The following detailed description explains how the foregoing is accomplished.

Figure 1:
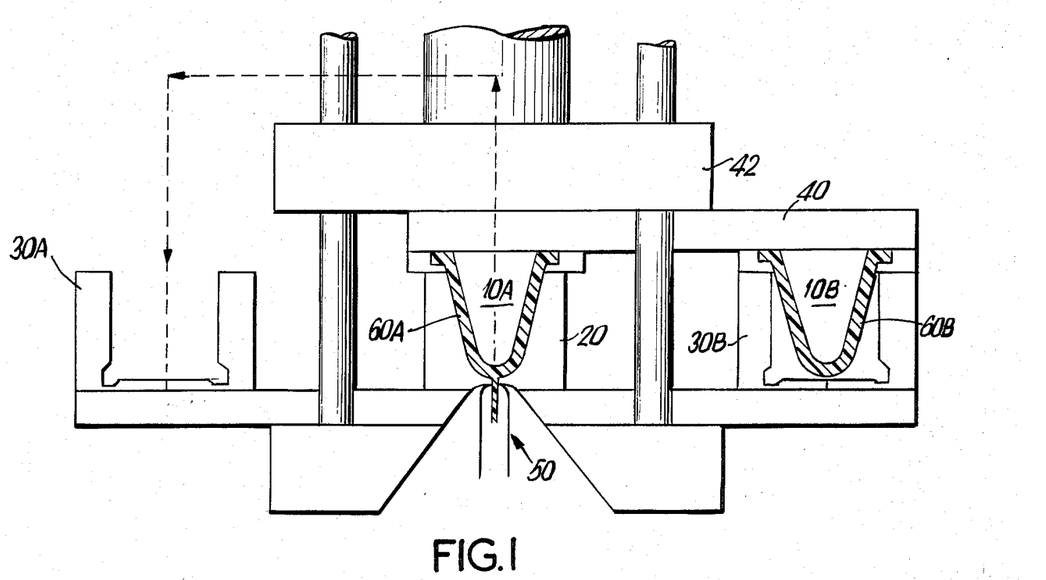
FIG. 1 is a schematic view in cross-section of injection blow molding apparatus.

FIG. 1 shows a portion of the injection blow molding machine (IBM) of the present invention. Two core pins 10A, 10B are mounted on a transversely moveable plate 40 on the axially moveable platen 42 of the machine. Core pin 10A is positioned in an injection mold 20 while core pin 10B is positioned in a blow mold 30B. When plate 40 is traversed to the left, core pin 10A will be in the blow mold 30A and core pin 10B will be in the injection mold 20. A parison is removed from the mold by axial retreat of the moveable platen 42 and the plate 40 with core pins 10 is traversed either left or right to the available blow mold. FIG. 1 shows blow mold 30A ready to receive the parison and shows blow mold 30B containing a parison 60B. Parison 60B is inflated with air to assume the shape of blow molding cavity 30B while parison 60A is being injected in cavity 20. The blow molds open as the platen retreats to eject the finished container. The plate 40 shuttles back and forth each cycle so that a container is blown simultaneously each time a parison is injected.

Figure 2:
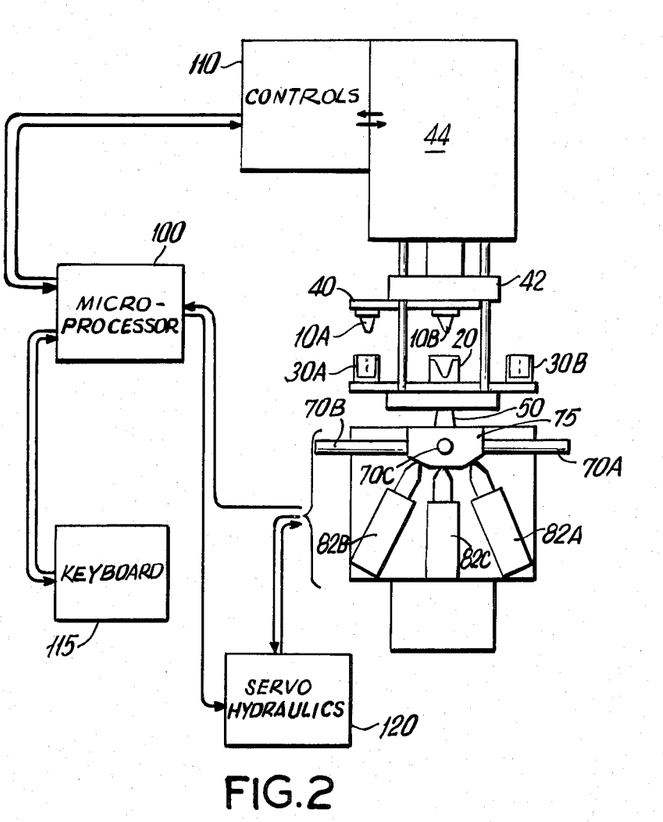
FIG. 2 is a schematic view of the apparatus of the present invention.

FIG. 2 shows the general layout of the injection blow molding machine and indicates the control means. Plasticators 82A, 82B, 82C feed three rams 70A, 70B, 70C for three polymer melts which are fed to a manifold block 75 which contains separate passages leading to a multi-passage nozzle 50 for the injection mold 20. The platen 42 is moved axially of the mold by a hydraulic press 44. Control circuitry means for the press and blowing cycles are indicated at press control block 110. A microprocessor 100 is programmed to control the servo hydraulics 120 which control the individuall injection rams and to command the press control block 110.

Figure 3:
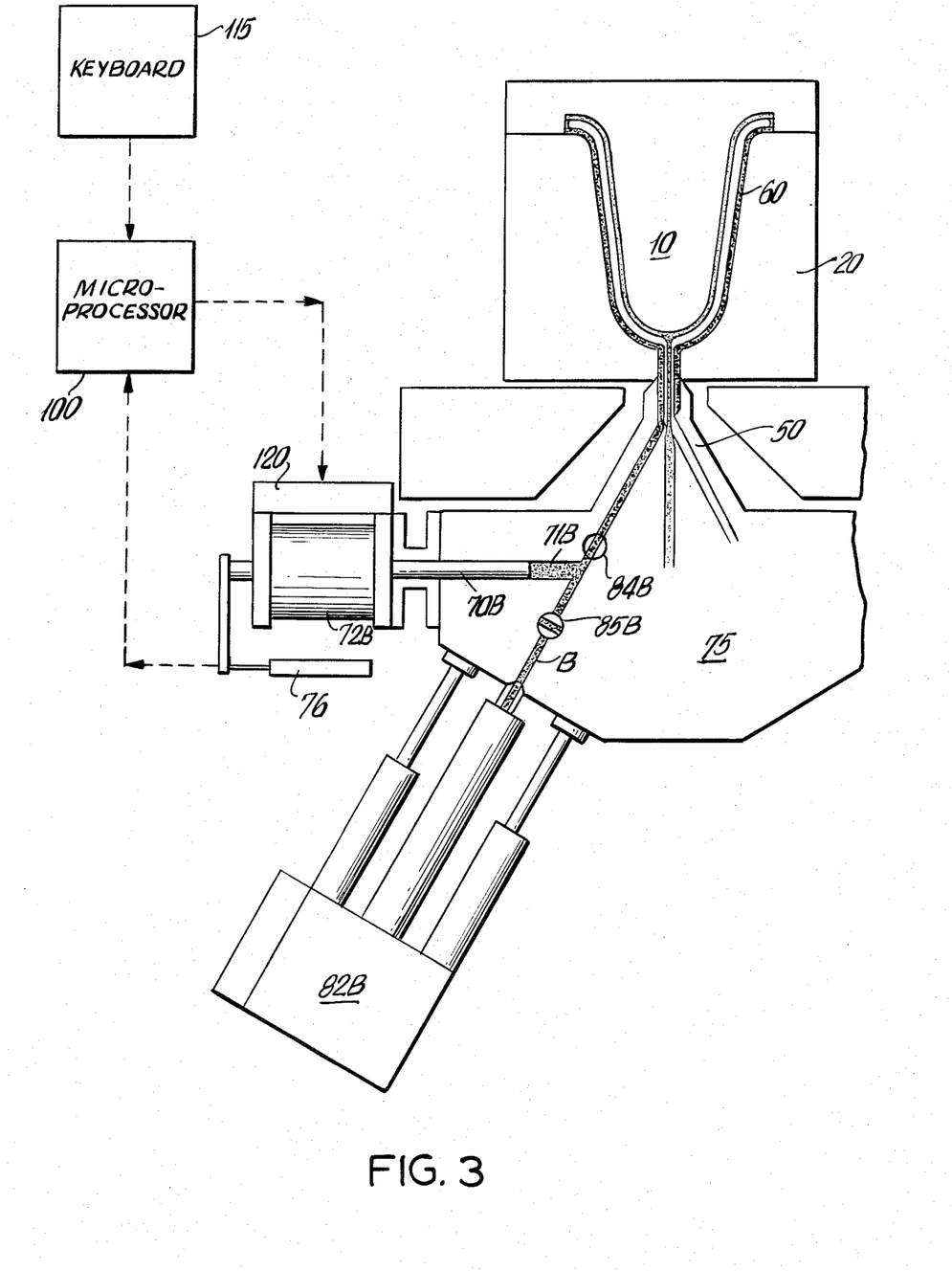
FIG. 3 is a simplified view of the injection apparatus of the present invention.

FIG. 3 shows one of the plural plasticators 82B for melting and supplying molten polymer B to an injection ram 70B. The plasticator 82B is a conventional reciprocating screw device which forces molten polymer into the cylinder 71B of the ram when manifold valve 84B is closed and manifold valve 85B is opened and the ram is retreated to the left by hydraulic actuator 72B. When the ram cylinder 71B is charged with molten resin, valve 85B is closed. Upon a control signal from the microprocessor 100, valve 84B is opened and the servo control 120 for the ram causes the ram to advance to the right, according to a displacement-time schedule stored in the microprocessor program. A displacement transducer 76 provides an analog signal proportional to ram displacement to complete a feed-back loop for the servo 120. Polymer B forced according to the program flows past valve 84B through the manifold passages to the injection nozzle, through the nozzle passages and into the injection mold cavity where polymer B becomes the outside layer of a parison 60.

Figure 4:
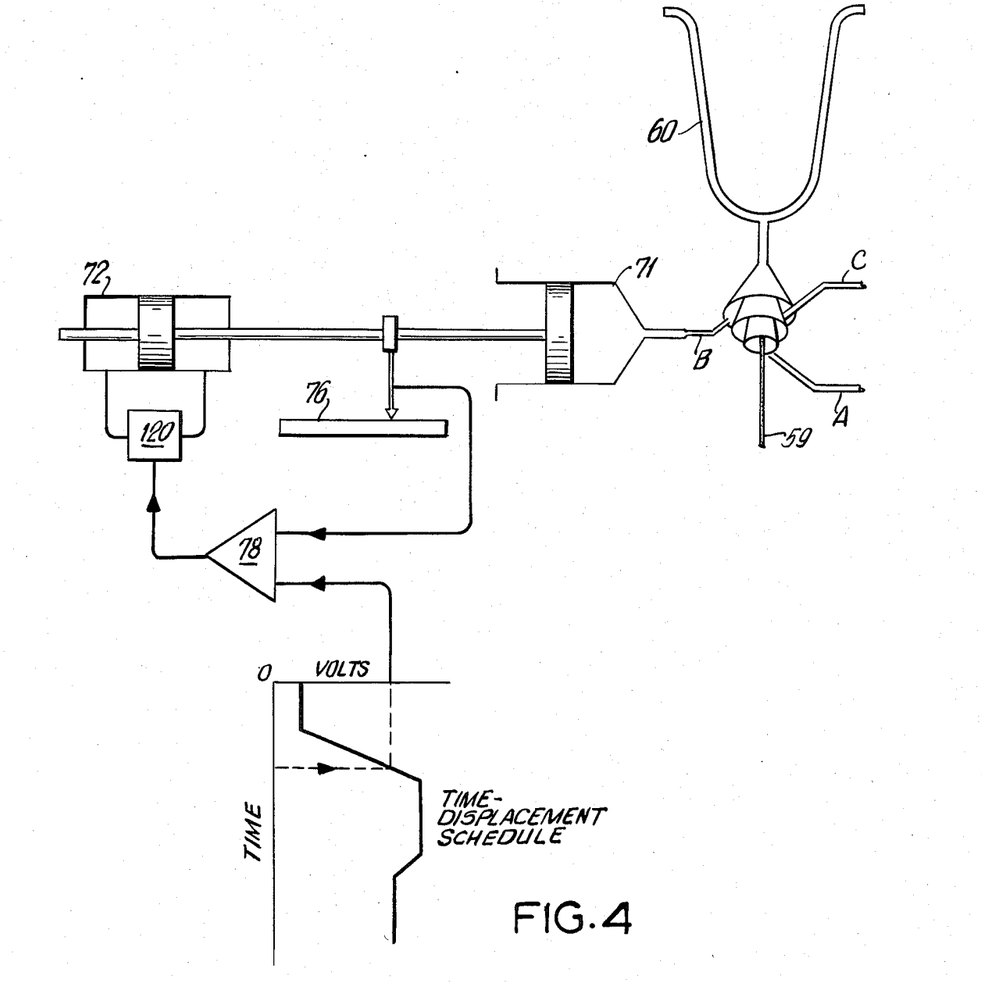
FIG. 4 is a schematic view illustrating the control system for one of the injection rams.
Figure 5:
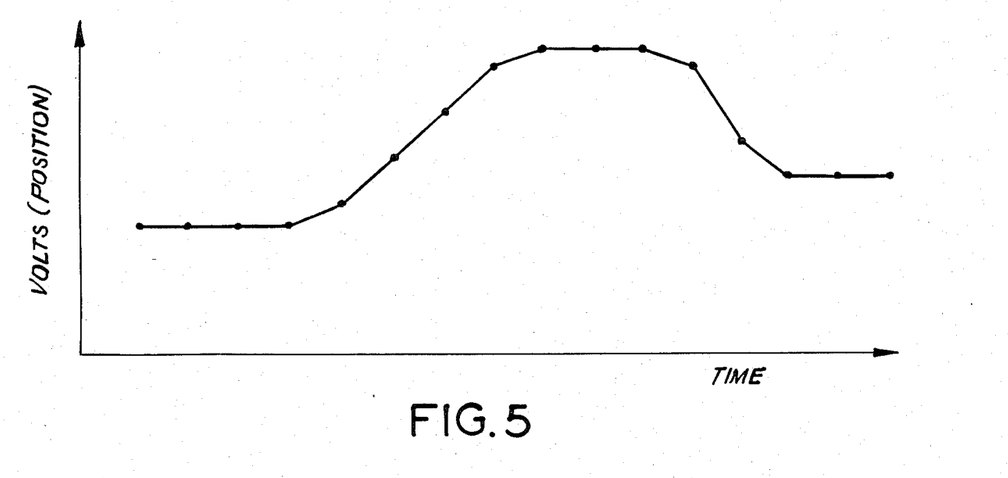
FIG. 5 is a plot of the position of one of the injection rams as a function of time.

FIG. 4 shows schematically the servo loop where the control signal from the microprocessor 100 (shown as voltage as a function of time) and a position signal from the displacement transducer 76 are algebraically combined in an amplifier 78 and the resulting signal is used to control the hydraulic servo 120 for the hydraulic actuator 72. A typical ram position control signal is shown in FIG. 5. Since displacement is measured by transducer 76, the plot is in voltage as a function of time.

Figure 6:
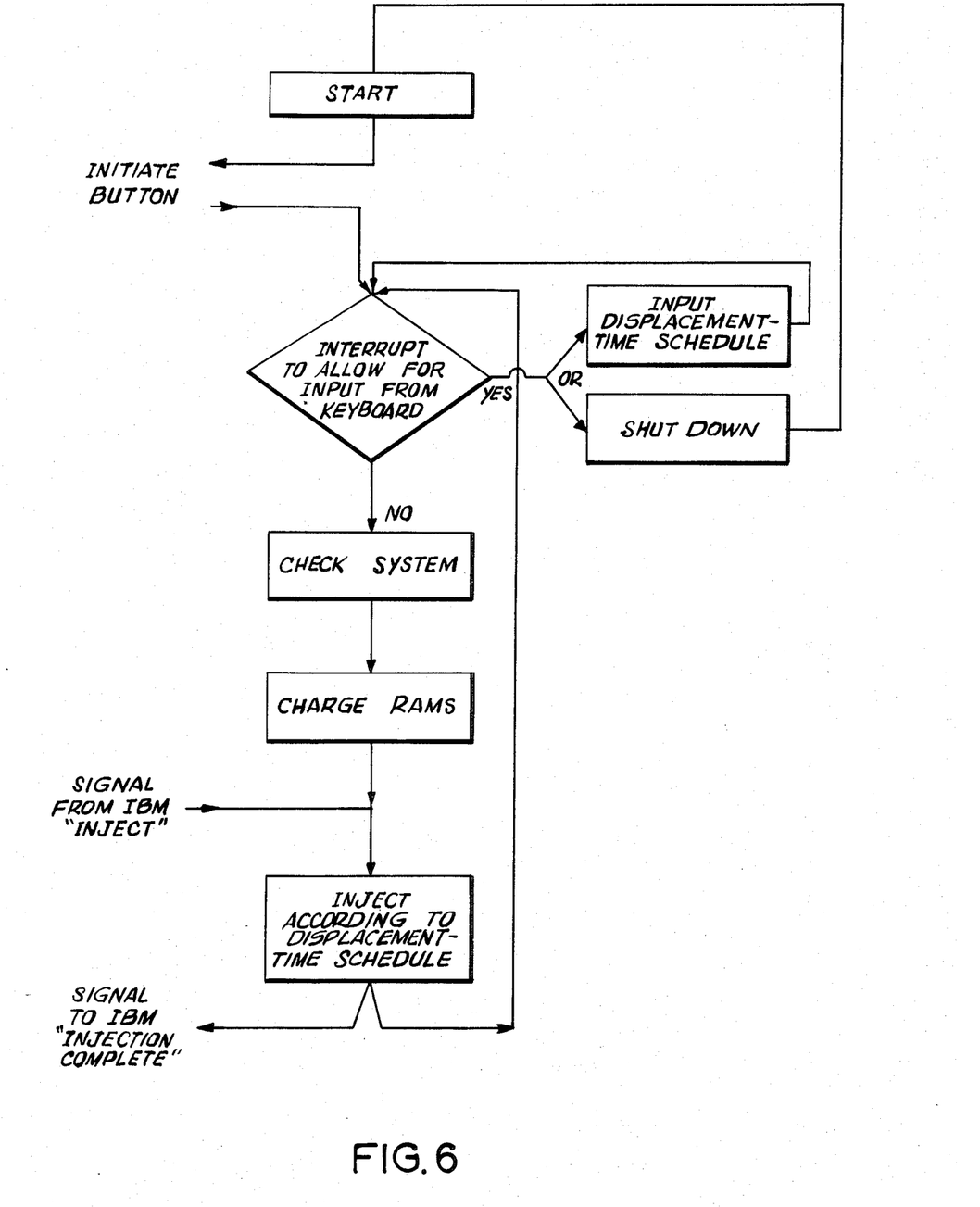
FIG. 6 is a flow chart for the control system for the apparatus.

FIG. 6 is a flow chart of the system used to control the machine. The injection blow molding machine is indicated as IBM on the chart. Upon initiation of the cycle, the program checks position of valves, rams, etc. and if all are proper, recharges the ram cylinders 71 from the plasticators 82. The IBM control circuit 110 provides an "inject" signal to the microprocessor 100. Injection is carried out according to the ram displacement-time schedule of the microprocessor and is terminated at the end of the schedule. An "injection complete" signal is sent to the IBM. The control 110 then causes the IBM to traverse to place the parison in the blow mold and to procede with the blow molding phase. The machine continues to cycle through this sequence. Keyboard 115 may be used to change the displacement-time schedule or to shut down the machine.

Figure 7:
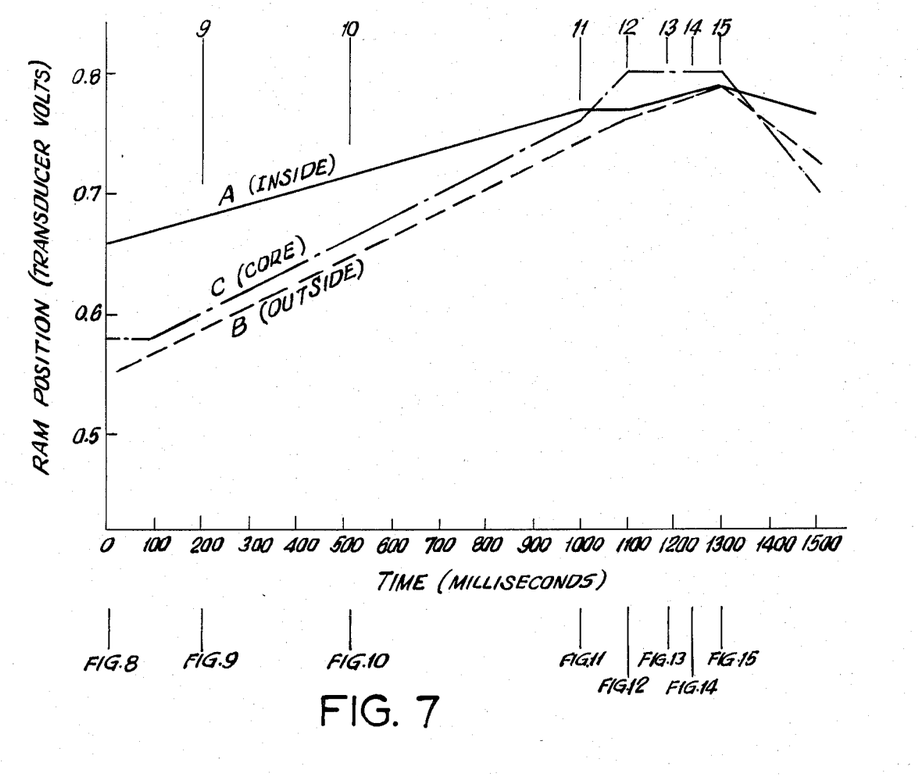
FIG. 7 is a plot of ram position as a function of time for three rams.

FIG. 7 is a plot of ram displacement as a function of time for three rams. The positions of the rams are measured as the voltage analog output of the transducers 76 for each ram. The polymer for the inside surface layer is "A"; that for the core layer "C"; and that for the outside surface layer is "B". In this figure an upward slope indicates a forward motion of the ram to deliver polymer, a horizontal slope indicates a stopped ram, and a downward slope indicates a retreat of the ram. The significance of FIG. 7 is perhaps better understood by reference to FIGS. 8-15, which show the flow of the polymers at the exit of the nozzle 50 and the entrance 52 of the injection mold cavity 20 at the rounded bottom of the parison. FIGS. 8-15 are taken at different times in the cycle and those times are keyed to FIG. 7.

Figure 8:
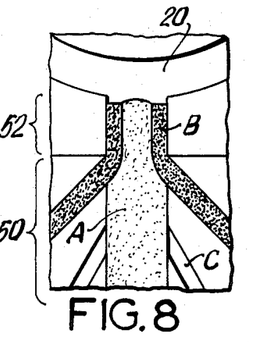
FIGS. 8–15 are views in cross-section taken through the nozzle and cavity showing the confluence of flow of the various layers at various times during the injection cycle.
Figure 9:
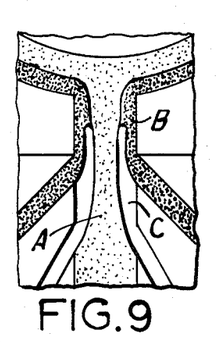
Figure 10:
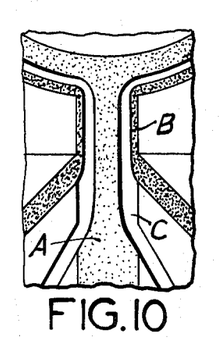

FIG. 8 represents the conditions at the start of a cycle at time 0. The cavity 20 is empty. The entrance 52 of the cavity 20 initially contains only the polymers A and B for the inside and outside surface layers. The rams for polymers A and B begin to advance to force those polymers into the cavity. At about 100 milliseconds into the cycle the ram for the core layer, polymer C, begins to advance. FIG. 9 shows that polymer C has joined the flow stream in the entrance and polymer C is about to enter the cavity. FIG. 10, taken at about 250 milliseconds, shows the flow of the three polymers as the cavity continues to be filled. All three polymer layers must extend throughout the entire length of the parison. Since the flow in the mold cavity is laminar, the velocity in the middle of the stream is higher than the velocities at the cavity walls. Therefore, initiation of flow of polymer C is retarded enough (i.e., about 100 milliseconds) so that polymer C will reach the far end of the cavity just as the slower moving surface layers (A and B) reach the end. In this way, the far end of the parison, that which becomes the mouth end of the container, will have all layers present in their proper positions.

Figure 11:
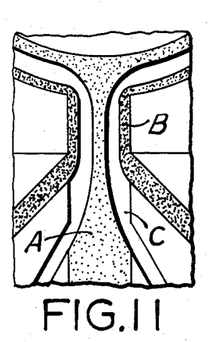
Figure 12:
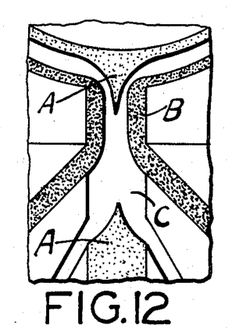
Figure 13:
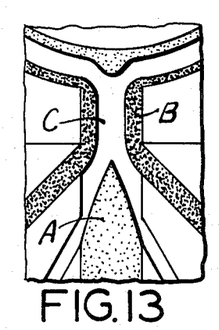
Figure 14:
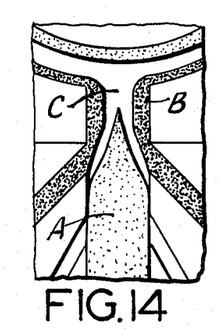
Figure 15:
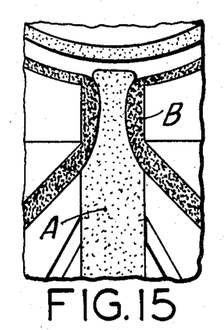

At about 1000 milliseconds into the injection cycle, the ram for polymer A (the inside surface layer) is stopped and the ram for polymer C (the core layer) can be accelerated slightly to achieve the desired thickness of material in the bottom of the container. Polymer A is necked down in the entrance 52 as is shown in FIG. 11 until it effectively is severed as shown in FIG. 12. At 110 milliseconds the ram for polymer C is stopped and the ram for polymer A is restarted. FIGS. 13 and 14 show polymer A advancing to pinch off polymer C in the entrance, thereby pushing the last of polymer C into the cavity 20 with polymer A to bury or encapsulate to isolate polymer C from exposure at the surface of the parison. FIG. 15 shows polymer A knit to polymer B at the entrance to complete the encapsulation of polymer C and to return to the conditions at the start as shown in FIG. 8. At the time of FIG. 15 (1300 milliseconds) all three rams are retreated to depressurize to cavity to prevent expansion of the parison when the cavity is opened and to depressurize the polymers remaining in the nozzle and entrance to prevent exudation from the nozzle while the cavity is open. This exudation leads to premature flow of polymers into the cavity during the next cycle which can lead to smearing of polymer C on the surfaces of the container.

1500 milliseconds marks the end of the injection phase of the container cycle for this example. Subsequent to the end of the injection phase of the cycle, manifold valves 84, 85 are actuated and the ram cylinders 71 are recharged with their polymers by the plasticators 82. The injection mold is opened by retreating the hydraulic press 44 to withdraw the core pin 10 from the cavity 20. The parison just formed is transferred to one of the blow mold cavities 30A, 30B and the container which was blow molded simultaneously with the injection cycle is ejected from the blow mold in which it was finished.

Figure 16:
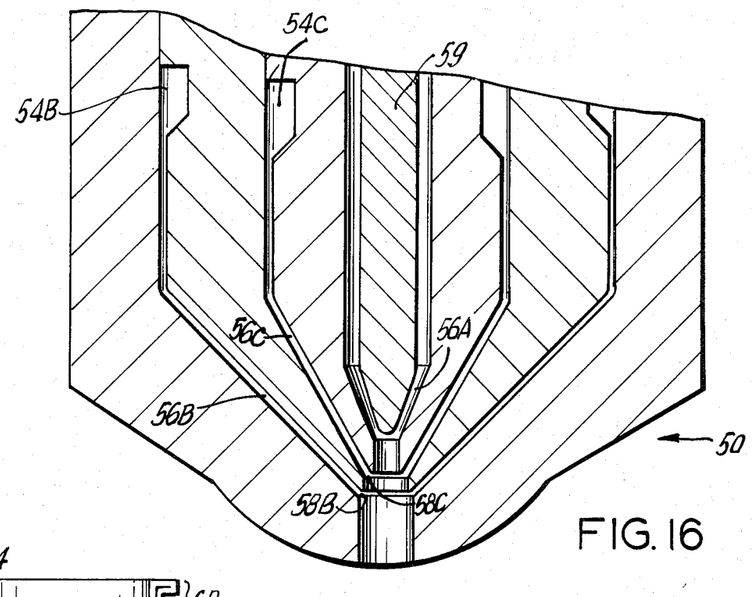
FIG. 16 is a view in cross-section of the injection nozzle.

FIG. 16 shows a nozzle 50 appropriate for injection of a parison having a three layer wall. Polymer B, which forms the outside surface layer, is delivered by the ram 70B to an annular distribution channel 54B which distributes the polymer circumferentially of the nozzle structure. Polymer B advances along a conical passage 56B to an annular orifice 58B at the exit of the nozzle which leads to the injection cavity. Similarly, polymer C, which forms the core layer, is delivered by ram 70C to annular distribution channel 54C and thence along conical passage 56C to annular orifice 58C. Polymer A, which forms the inside surface layer, is delivered by the ram 70A to a passage 56A which exits at the center of the concentric flows issuing from orifices 58B and 58C. A nozzle shut off valve 59 can be moved axially to arrest flow of polymer A.

Figure 17:
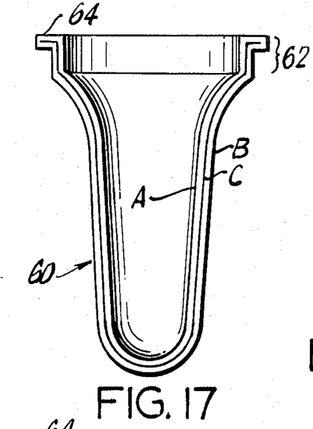
FIG. 17 is a view in cross-section of the parison.
Figure 18:
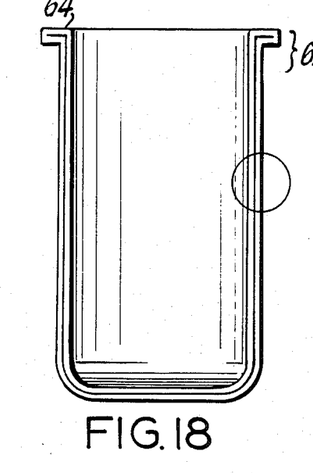
FIG. 18 is a view in cross-section of the finished container.

FIGS. 17 and 18 compare the pinion 60 as injection molded with the finished container. The neck portion 62 remains virtually unchanged during blow molding. The parison is held by the chilled neck portion while the hot and soft parison is blown. Thus, the neck 62 including the flange 64 is essentially formed in the injection mold. The remainder of the parison walls are thinned as the parison is stretched during blow molding.

FIG. 18 shows that the core layer C extends throughout the flange 64, but does not penetrate the flange edge. This is accomplished in large part by selection of the delay time in starting the ram for the core polymer. The flange 64 will be employed in a double seam seal when a metal end is crimped, by well known techniques, onto the container mouth to close the filled container. Since the flange represents a significant area, it is important that the core layer extend well into the flange. The programmed flows of the various polymers also ensure that the core layer is not exposed at the sprue mark at the central exterior of the container.

Figures 19, 20, 21:
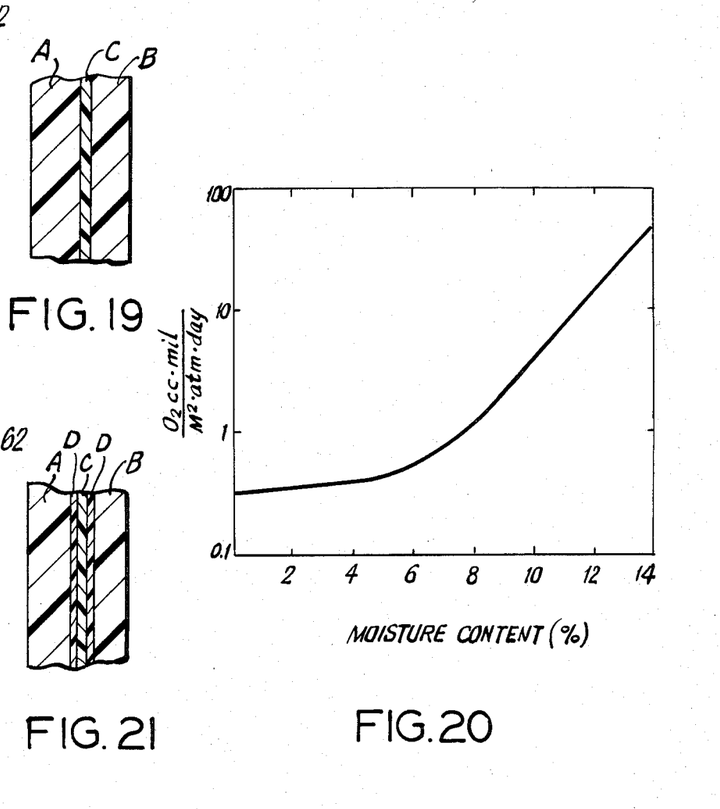
FIG. 19 is an enlarged view of a portion of a container wall having three layers.
FIG. 20 is a plot of the oxygen permeability of a barrier material as a function of moisture content.
FIG. 21 is an enlarged view of a portion of a container wall having five layers.

FIG. 19 is an enlargement of the container wall within the circle of FIG. 18. Layer A is the inside surface layer formed from polymer A in the foregoing description. Layer B is the outside surface layer, formed from polymer B. Layer C is the core or barrier layer formed from polymer C. The thinnest layer is the relatively expensive barrier polymer C. The relative thickness of the three layers is controlled by controlling the relative flow rates of the three polymers by microprocessor control of the displacement rates of the rams. A preferred wall structure is a layer of a blend of high density polyethylene and polypropylene on each face of a core carrier layer of ethylene vinyl alcohol copolymer (EVOH).

FIG. 20 shows how the oxygen barrier quality of EVOH decreases abruptly at high levels of moisture. Where the EVOH layer is thin, only a small quantity of water will cause a large increase in oxygen permeability. For this reason, the EVOH layer must adequately be protected against the intrusion of moisture.

Polyolefins do not adhere well to EVOH. Adhesion can be improved by adding adhesion promotors to the polyolefin, the EVOH or both. Another approach is to provide an intermediate layer of an adherent polymeric material which adheres to the polyolefin and the EVOH. Such materials include manifold polyolefins sold under the name Plexar by the Chemplex Company of Rolling Meadows, Ill. These comprise a blend of a polyolefin and a graft copolymer of high density polyethylene and an unsaturated fused ring carboxylic acid anhydride. The polyolefin component of the blend can be polyethylene or preferably is an olefin copolymer such as ethylene vinyl acetate. Schroeder application Ser. No. 059,375 filed Dec. 28, 1978 teaches the use of these materials to bond to EVOH. The materials themselves are disclosed in U.S. Pat. Nos. 4,087,587 and 4,087,588. We have found these modified polyolefins to be suitable as interlayers to improve adhesion between the polyolefin surface layers and the EVOH core layer.

Another suitable material for use as a interlayer to improve adhesion between the EVOH polyolefins are maleic anhydride grafted polyolefins sold under the name Admer by Mitsui Petrochemical Industries of Tokyo, Japan.

The use of interlayers on each side of the EVOH oxygen barrier layers results in a five layer container. To produce such a container, the three passage nozzle of FIG. 16 is placed with a five passage nozzle of similar construction. Where the inside and outside surface layers are of the same polymer one ram can be used for both those layers. The flow from that ram is divided and proportioned with part supplying the central axial passageway to form the inside surface layer and the balance supplying the outermost nozzle annular orifice. The two additional nozzle orifices are located just inside and just outside the nozzle orifice for the EVOH barrier layer. The two additional annular nozzle orifices can be supplied with the interlayer polymer from a single ram, the flow being divided and proportioned. Thus, a three ram machine can produce a five layer parison. Greater control can be exercised over the polymer flows by using a machine with an independently controllable ram for each layer. A nozzle shut off valve can be employed to selectively control the polymer flows. The three layers of interlayer polymer and the barrier polymer can be treated as a single core layer. A five layer wall is shown in FIG. 21 wherein layers A and B are the inside and outside surface layers of polyolefin, layer C is the barrier layer of EVOH, and two layers D are the interlayer material.

EXAMPLE I

Five layer containers having a capacity of about 5½ ounces, of 202×307 size, weighing about 11 g were made using a five orifice nozzle on a three ram machine. The inside and outside surface layers were polypropylenepolyethylene block copolymer (Hercules Profax 7631). The adhesive interlayers were ethylene vinyl acetate copolymer blended with a graft copolymer of high density polyethylene and a fused ring carboxylic acid anhydride (Plexar 1615-2). The oxygen barrier was EVOH (Kuraray EVAL EP-F, available from Kuraray Co. Ltd., Osaka, Japan). The layers were well adhered. The barrier extended to the flange lip and was completely encapsulated.

EXAMPLE II

Five layer containers similar to those of Example I were made wherein the inside and outside surface layers were polypropylene (EXXON E612); the interlayer material was Plexar III, a blend of ethylene vinyl acetate copolymer and a graft copolymer; and the barrier was EVAL EP-F. The layers were well adhered. The barrier layer extended to the lip of the flange and was completely encapsulated.

EXAMPLE III

Five layer containers similar to those of Example I were made wherein the inside and outside surface layers were a 50—50 blend of polypropylene (EXXON E612) and high density polyethylene (Chemplex 5701); the interlayer material was Plexar III; and the barrier layer was EVAL EP-F. The layers were well adhered. The barrier layer extended to the lip of the flange and was completely encapsulated.

EXAMPLE IV

Five layer containers similar to those of Example I were made wherein the inside and outside surface layers were a copolymer of propylene and ethylene (Hercules Profax 7631); the interlayer material was maleic anhydride grafted polyolefin (Mitsui Admer QB 530); and the barrier layer was EVAL EP-F. The layers were well adhered. The barrier layer extended to the lip of the flange and was completely encapsulated.

In the making of the containers of Examples I–IV the injection schedule began feeding the inside and outside surface layer polymer then the polymer for the adhesive interlayer was started and substantially simultaneously the barrier layer polymer was started. The flows of the adhesive interlayer polymer and the barrier layer polymer were terminated before the outside surface layer polymer flow was terminated.

We claim:
1. A method of making a multi-layer rigid article comprising the steps of:
   (A) injection molding from a nozzle having an exit a parison in an injection mold cavity, by:
      (1) establishing in the exit the flow of a first polymer stream to become the inside surface layer of the parison and the flow of a second polymer stream to become the outside surface layer of the parison,
      (2) subsequently establishing in the exit the flow of a third polymer stream between the first and second polymer streams,
      (3) continuing the flow of the first, second and third polymer streams concurrently, when the cavity is nearly filled,
      (4) terminating the flow of the first polymer stream,
      (5) subsequently terminating the flow of the third polymer stream, and then
      (6) subsequently terminating the flow of the second polymer stream,
   (B) transferring the injection molded parison to a blow molding cavity having the configuration of the article, and
   (C) inflating the parison in the blow molding cavity to form the article.
2. The method of claim 1 wherein a fourth polymer stream is introduced between the third and first polymer streams and a fifth polymer stream is introduced between the third and second polymer streams, the flow of the fourth and fifth polymer streams terminating before termination of the flow of the second polymer stream.

3. A method of making a multi-layer rigid container comprising the steps of:
   (A) injection molding a parison having an open end and a closed end in an injection mold cavity having a core pin and an entrance for polymer at the closed end of the parison by:
      (1) establishing in the entrance a flow of polymer comprising a central stream of a first polymer surrounded by an annular stream of a second polymer,
      (2) subsequently commencing an annular stream of a third polymer between the first and second polymer streams,
      (3) maintaining the flow of the three polymer streams until the cavity is nearly filled,
      (4) terminating the flow of the first polymer stream,
      (5) terminating the flow of the third polymer stream,
      (6) terminating the flow of the second polymer stream,
   (B) transferring the parison to a blow mold cavity,
   (C) inflating the parison in the blow mold cavity to blow mold the parison into the finished container.

4. The method of claim 3 wherein following the termination of flow of the third polymer, flow of the first polymer is recommenced and flow of the first polymer is terminated approximately simultaneously with the flow of the second polymer.

5. The method of making a multi-layer injection molded article using a nozzle having an exit comprising the steps of:
   (1) establishing in the exit the flow of a first polymer stream to become the inside surface layer of the article and the flow of a second polymer stream to become the outside surface layer of the article,
   (2) commencing the flow of a third polymer stream between the first and second polymer streams such that the third polymer stream reaches the exit after the first and second polymer streams reach the exit,
   (3) continuing the flow of the first, second and third polymer streams concurrently,
   (4) terminating the flow of the first polymer stream,
   (5) subsequently terminating the flow of the third polymer stream, and then
   (6) subsequently terminating the flow of the second polymer stream.

6. The method of claim 5 wherein a fourth polymer stream is introduced between the third and first polymer streams and a fifth polymer stream is introduced between the third and second polymer streams, the flow of the fourth and fifth polymer streams terminating before termination of the flow of the second polymer stream.

7. A method of forming a multi-layer plastic parison for an injection blow molded article by use of a nozzle having an exit, comprising the steps of:
   (1) initially commencing the injection through said exit of a first inside surface layer;
   (2) commencing the injection through said exit of a second outside surface layer while continuing to inject the first layer;
   (3) then commencing the injection of a third core layer while continuing to inject the first and second layers such that in the nozzle prior to the nozzle exit the third core layer is introduced between first and second layers;
   (4) continuing the injection of the first, second and third layers concurrently through the nozzle exit;
   (5) then terminating the injection of the first layer while continuing to inject the second and third layers;
   (6) then terminating the injection of the third layer;
   (7) then terminating the injection of the second layer.

8. A method of making a multi-layer rigid article comprising the steps of:
   (A) injection molding, from a nozzle having an exit, a parison in an injection mold cavity by:
      (1) establishing in the nozzle prior to the exit the flow of a first polymer stream to become the inside surface layer of the parison and the flow of a second polymer stream to become the outside surface layer of the parison,
      (2) subsequently establishing in the nozzle prior to the exit the flow of a third polymer stream between the first and second polymer streams,
      (3) continuing the flow of the first, second and third polymer streams concurrently, when the cavity is nearly filled,
      (4) terminating the flow of the first polymer stream,
      (5) subsequently terminating the flow of the third polymer stream, and then
      (6) subsequently terminating the flow of the second polymer stream,
   (B) transferring the injection molded parison to a blow molding cavity having the configuration of the article, and
   (C) inflating the parison in the blow molding cavity to form the article.

9. A method of making a multi-layer rigid article comprising the steps of:
   (A) injection molding, from a nozzle having an exit, a parison in an injection mold cavity by:
      (1) establishing in the exit the flow of a first polymer stream to become the inside surface layer of the parison and the flow of a second polymer stream to become the outside layer of the parison, and the flow of a third polymer stream between the first and second polymer streams, when the cavity is nearly filled,
      (2) terminating the flow of the first polymer stream,
      (3) subsequently terminating the flow of the third polymer stream, and then
      (4) subsequently terminating the flow of the second polymer stream,
   (B) transferring the injection molded parison to a blow molding cavity having the configuration of the article, and
   (C) inflating the parison in the blow molding cavity to form the article.

10. In a method of making a multi-layer injection molded rigid article using a nozzle having an exit, the steps comprising:
   (1) establishing in the exit the flow of a first polymer stream to become the inside surface layer of the article, the flow of a second polymer stream to become the outside surface layer of the article, and the flow of a third polymer stream between the first and second polymer streams,
   (2) continuing the flow of the first, second and third polymer streams concurrently through the nozzle exit,
   (3) terminating the flow of the first polymer stream, (4) subsequently terminating the flow of the third polymer stream, and (5) subsequently terminating the flow of the second polymer stream.

11. In a method of making a multi-layer injection molded rigid article using a nozzle having an exit, the steps comprising:

(1) establishing in the exit the flow of a central first polymer stream, the flow of an annular second polymer stream substantially surrounding the first stream, and the flow of an annular third polymer stream between the first and second polymer streams, (2) continuing the flow of the first, second and third polymer streams concurrently through the nozzle exit, (3) terminating the flow of the first polymer stream, (4) terminating the flow of the third polymer stream, and (5) terminating the flow of the second polymer stream.

12. The method of claim 1, 3, 5, 8 or 9 wherein the flows of the first and second polymer streams are established substantially simultaneously.

13. The method of claim 10 or 11 wherein the flows of the first and second streams are established before the flow of the third stream is established.

14. The method of claim 13 wherein the flows of the first and second streams are established substantially simultaneously.

15. The method of claim 13 wherein the flow of one of said first and second streams is established before the flow of the other of said first and second streams is established.

16. The method of claim 1 or 2 wherein there is included the step of controlling the relative thicknesses of the layers of the multi-layer article by independently controlling the relative flow rates of the polymer streams.

17. The method of claim 3 or 4 wherein there is included the steps of controlling the relative thicknesses of the layers of the multi-layer rigid container by independently controlling the relative flow rates of the polymer streams.

18. The method of claim 5 or 6 wherein there is included the step of controlling the relative thicknesses of the layers of the multi-layer injection molded article by independently controlling the relative flow rates of the polymer streams.

19. The method of claim 7 wherein there is included the step of controlling the relative thicknesses of the layers of the multi-layer plastic parison by independently controlling the relative flow rates of the layers.

20. The method of claim 8 wherein there is included the step of controlling the relative thicknesses of the layers of the article formed from the first, second and third polymer streams by independently controlling the relative flow rates of the streams.

21. The method of claim 9 wherein there is included the step of controlling the relative thicknesses of the layers of the article formed from the first, second and third polymer streams by independently controlling the relative flow rates of the streams.

22. The method of claim 10 or 11 wherein there is included the step of controlling the relative thicknesses of the layers of the article formed from the first, second and third polymer streams by independently controlling the relative flow rates of the streams.

23. A method of making a multi-layer injection molded article in an injection mold cavity having an entrance sprue comprising the steps of (1) providing at least three concentric streams of polymeric materials concurrently flowing through the sprue into the injection cavity, said flowing streams comprising a first stream to become the inside surface layer of the injected article, a second stream to become the outside surface layer of the injected article, and at least one stream flowing between said first and second streams to become a core layer in the injected article, (2) independently and continuously controlling the rate of flow of each of the flowing streams into the injection cavity to control the location and thickness of the flowing core layer stream relative to said flowing first and second streams, and (3) terminating the flow of the first polymer stream, subsequently terminating the flow of the at least one polymer stream that is to form the core layer stream, and subsequently terminating the flow of the second polymer stream.

24. A method of making a multi-layer injection molded article in an injection mold cavity having an entrance sprue comprising the steps of (1) providing at least three concentric streams of polymeric materials concurrently flowing through the sprue into the injection cavity, said flowing streams comprising a first stream to become the inside surface layer of the injected article, a second stream to become the outside surface layer of the injected article, and at least one stream flowing between said first and second streams to become a core layer in the injected article, (2) controlling the relative thicknesses of the streams by independently and continuously controlling the relative flow rates of the streams, and (3) terminating the flow of the first polymer stream, subsequently terminating the flow of at the least one polymer stream that is to form the core layer stream, and subsequently terminating the flow of the second polymer stream.

25. A method of making a multi-layer injection molded article by use of a coinjection nozzle having an exit comprising the steps of (1) flowing at least three concentric streams of polymer material concurrently through the nozzle exit, said flowing streams comprising a first stream to become the inside surface layer of the injected article, a second stream to become the outside surface layer of the injected article, and at least one stream flowing between said first and second streams to become a core layer in the injected article, (2) independently and continuously controlling the rate of flow of each of the streams through the nozzle exit to control the thickness of each of said layers of the article, and (3) terminating the flow of the first polymer stream, subsequently terminating the flow of said at least one polymer stream that is to form the core layer stream, and subsequently terminating the flow of the second polymer stream.

26. The method of claim 1, 3, 5, 7, 8, 9, 10, 11, 23, 24 or 25 wherein the first and second streams are of substantially the same polymeric material.

27. The product of the process of claim 5 wherein the layer of the product formed from the third polymer stream is continuous, completely encapsulated within the surface layers and is an oxygen barrier which is sufficiently impermeable to oxygen as to protect food products from oxidative degradation.

28. The product of the process of claim 6.

29. The product of the process of claim 7 wherein the layer of the product formed from the third polymer stream is continuous, completely encapsulated within the surface layers and is an oxygen barrier which is sufficiently impermeable to oxygen as to protect food products from oxidative degradation.

30. The product of the process of claim 1, 3, 5, 8, 9, 10, 11, 16, 17, 18, 19, 20, 21 or 22 wherein the layer formed from the third polymer stream is thinner than the layer formed from the first polymer stream and is thinner than the layer formed from the second polymer stream.

31. The product of the process of claim 1, 3, 5, 8, 9, 10, 11, 16, 17, 18, 19, 20, 21 or 22 wherein the layer formed from the third polymer stream is the thinnest layer of the article.

32. The product of the process of claim 23, 24 or 25 wherein said core layer is thinner than said inside surface layer and is thinner than said outside surface layer.

33. The product of the process of claim 23, 24 or 25 wherein said core layer is the thinnest layer of the article.

34. An injection blow molded multi-layer rigid plastic container having a continuous core layer which is sufficiently impermeable to oxygen as to protect food products from oxidative degradation and which is completely encapsulated within outer layers.

35. The container of claim 34 wherein the inside surface layer is a polyolefin, the core layer is ethylene vinyl alcohol copolymer having a layer of an adherent polymeric material on each face of the ethylene vinyl alcohol copolymer, and the outside surface layer is a polyolefin.

36. The container of claim 35 wherein the polyolefin layers are a blend of polyethylene and polypropylene and the layers of adherent polymeric material are a blend of ethylene vinyl acetate copolymer and a graft copolymer of polyethylene and an unsaturated fused ring carboxylic acid anhydride.

37. The container of claim 34 wherein the inside surface layer is a polyolefin, the core layer is ethylene vinyl alcohol copolymer having a layer of maleic anhydride grafted polyolefin on each face of the ethylene vinyl alcohol copolymer, and the outside surface layer is a polyolefin.

38. The container of claim 37 wherein the polyolefin layers are a copolymer of propylene and ethylene.

39. The container of claim 35 wherein the polyolefin is polyethylene.

40. The container of claim 35 wherein the polyolefin is polypropylene.

41. The container of claim 35 wherein one surface layer is polypropylene and the other surface layer is polyethylene.

42. The container of claim 37 wherein the polyolefin is polypropylene.

43. The container of claim 35 wherein at least one of the surface layers is a blend of polyethylene and polypropylene.

44. The container of claim 35 wherein at least one of the surface layers is a copolymer of propylene and ethylene.

45. The container of claim 35 or 36 wherein the core layer is thinner than the combined thicknesses of the inside surface layer and of the layer of adherent material which is proximate to said surface layer.

46. An injection molded multi-layer plastic parison for a blow molded container, said parison having a continuous core layer which is sufficiently impermeable to oxygen as to protect food products from oxidative degradation and which is completely encapsulated within outer layers.

47. The container of claim 34 or 46 wherein the core layer is thinner than the encapsulating outer layers.

* * * * *

UNITED STATES PATENT AND TRADEMARK OFFICE
CERTIFICATE OF CORRECTION

PATENT NO. : 4,526,821
DATED : July 2, 1985
INVENTOR(S) : Robert J. McHenry, Robert Seebohm, & Martin A. Ryan It is certified that error appears in the above-identified patent and that said Letters Patent is hereby corrected as shown below:

The inventorship shown on the printed patent is corrected to read:

Robert J. McHenry, St. Charles, Ill.,
Robert Seebohm, Barrington, Ill., and
Martin A. Ryan, Dunwoody, Ga., Signed and Sealed this Fifteenth Day of October 1985

[SEAL]

Attest:

DONALD J. QUIGG

Attesting Officer

Commissioner of Patents and
Trademarks—Designate